(12) United States Patent  
Noyes

(10) Patent No.: US 9,325,905 B2  
(45) Date of Patent: Apr. 26, 2016

(54) GENERATING A ZOOMED IMAGE

(71) Applicant: QUALCOMM Incorporated, San Diego, CA (US)

(72) Inventor: Ying X. Noyes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 14/215,792

(22) Filed: Mar. 17, 2014

(65) Prior Publication Data

US 2014/0198237 A1  Jul. 17, 2014

Related U.S. Application Data

(62) Division of application No. 13/049,088, filed on Mar. 16, 2011, now abandoned.

(51) Int. Cl.
*H04N 5/232* (2006.01)
*H04N 5/345* (2011.01)

(52) U.S. Cl.
CPC ....... *H04N 5/23296* (2013.01); *H04N 5/23203* (2013.01); *H04N 5/23216* (2013.01); *H04N 5/3454* (2013.01)

(58) Field of Classification Search
CPC .......... H04N 5/23203; H04N 5/23216; H04N 5/23296; H04N 5/345; H04N 5/3454
See application file for complete search history.

(56) References Cited

U.S. PATENT DOCUMENTS

| 4,910,599 A | 3/1990 | Hashimoto |
| 5,428,390 A | 6/1995 | Cooper et al. |
| 5,719,953 A * | 2/1998 | Okabayashi et al. ......... 382/151 |
| 6,181,375 B1 | 1/2001 | Mitsui et al. |
| 6,750,903 B1 | 6/2004 | Miyatake et al. |
| 6,914,632 B1 | 7/2005 | Kim |
| 7,106,374 B1 | 9/2006 | Bandera et al. |
| 7,133,073 B1 | 11/2006 | Neter |

(Continued)

FOREIGN PATENT DOCUMENTS

| CN | 1471310 A | 1/2004 |
| CN | 1909591 A | 2/2007 |

(Continued)

OTHER PUBLICATIONS

Goljan, Miroslav, et al., "Camera Identification from Cropped and Sealed Images," Proceedings of SPIE-IS&T Electronic Imaging: Security, Forensics, Steganography, and Watermarking of Multimedia Contents X, Jan. 28-30, 2008, SPIE vol. 6819, 14 pages.
International Search Report and Written Opinion—PCT/US2012/029287—ISA/EPO—Jul. 6, 2012.
Lukac R., et al., "A new digital camera zooming solution", Electrical and Computer Engineering, 2004. Canadian Conference on Niagara Falls, Ont. Canada May 2-5, 2004, Piscataway, NJ, USA, IEEE, US, May 2, 2004, pp. 845-848, vol. 2, XP010733577, DOI:10.1109/CCECE.2004.1345246, ISBN: 978-0-7803-8253-4 the whole document.

(Continued)

*Primary Examiner* — Daniel M Pasiewicz
(74) *Attorney, Agent, or Firm* — Heejong Yoo

(57) ABSTRACT

An apparatus and method of generating a zoomed image is disclosed. A particular method includes receiving an instruction to perform a zoom operation. Window information is sent to an image sensor based on the instruction. The window information corresponds to a portion of the image sensor. In addition, a request to reduce the pixel clock rate may be sent to the image sensor. The request may cause the image sensor to reduce the pixel clock rate such that a frame rate of image data captured by the image sensor is maintained. Cropped image data corresponding to the portion of the image sensor is received. The cropped image data is upscaled to generate a zoomed image.

23 Claims, 8 Drawing Sheets

(56) References Cited

U.S. PATENT DOCUMENTS

| | | |
|---|---|---|
| 7,551,203 B2 | 6/2009 | Nakayama et al. |
| 2001/0038716 A1 | 11/2001 | Tsuchiya et al. |
| 2002/0100921 A1* | 8/2002 | Mabuchi et al. ............ 257/222 |
| 2005/0117049 A1 | 6/2005 | Suzuki |
| 2006/0125937 A1 | 6/2006 | LeGall et al. |
| 2006/0221213 A1 | 10/2006 | Watanabe et al. |
| 2006/0290792 A1 | 12/2006 | Nikkanen et al. |
| 2007/0188632 A1 | 8/2007 | Kobayashi |
| 2012/0236181 A1 | 9/2012 | Noyes |

FOREIGN PATENT DOCUMENTS

| | | | |
|---|---|---|---|
| EP | 1385334 | A2 | 1/2004 |
| EP | 1670241 | A2 | 6/2006 |
| EP | 1981262 | A1 | 10/2008 |
| JP | H07170461 | A | 7/1995 |
| JP | H07177407 | A | 7/1995 |
| JP | H0846845 | A | 2/1996 |
| JP | 2001057649 | A | 2/2001 |
| JP | 2001298621 | A | 10/2001 |
| JP | 2005020061 | A | 1/2005 |
| JP | 2006041867 | A | 2/2006 |
| JP | 2006094420 | A | 4/2006 |
| JP | 2006115117 | A | 4/2006 |
| JP | 2006174408 | A | 6/2006 |
| JP | 2007151170 | A | 6/2007 |
| JP | 2007221273 | A | 8/2007 |
| KR | 20020004169 | A | 1/2002 |
| WO | WO-0113649 | A1 | 2/2001 |

OTHER PUBLICATIONS

Lukac, Rastislav, et al., "Color Image Zooming on the Bayer Pattern," IEEE Transactions on Circuits and Systems for Video Technology, vol. 15, No. 11, Nov. 2005, 19 pages.

* cited by examiner

GENERATING A ZOOMED IMAGE

CLAIM OF PRIORITY UNDER 35 U.S.C. §119

The present Application for Patent is a divisional application of U.S. patent application Ser. No. 13/049,088 filed on Mar. 16, 2011, entitled "GENERATING A ZOOMED IMAGE," and assigned to the assignee hereof, which is hereby incorporated by reference in its entirety.

FIELD

The present disclosure is generally related to generating a zoomed image.

I. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Certain portable electronic devices include image sensors to capture images. For example, digital cameras, mobile telephones, digital video cameras, portable computing devices, and so forth, may include image sensors. These portable electronic devices may be able to perform zoom operations to provide a larger (or zoomed) view of a portion of an image. When a optical zoom capability is used, optics associated with an image sensor may be changed in order to generate an image at the image sensor that includes more detail of a particular area. When a digital zoom capability is used, a portion of the image data captured by the image sensor may be upscaled in order to extrapolate or interpolate additional pixel data between pixels that are actually captured by the image sensor. Such upscaling processes may increase latency of image processing, may use additional bandwidth, may increase a pixel clock rate to an unacceptable level, may cause other issues with image quality or processing, or any combination thereof.

II. SUMMARY

A zoomed image can be generated by sending window information to an image sensor. The window information indicates a portion of the image sensor from which image data is to be output as cropped image data. A pixel clock rate of the image sensor may also be reduced. The cropped image data may be upscaled and processed to generate the zoomed image.

In a particular embodiment, a method of generating a zoomed image is disclosed. The method includes receiving an instruction to perform a zoom operation and sending window information and a pixel rate reduction request to an image sensor based on the instruction. The pixel clock rate reduction request causes a rate at which frames of image data are captured by the image sensor to remain substantially constant or unchanged. The window information corresponds to a portion of the image sensor. The method also includes receiving cropped image data corresponding to the portion from the image sensor and upscaling the cropped image data to generate a zoomed image.

In another particular embodiment, an apparatus is disclosed that includes means to send window information to an image sensor in response to an instruction to perform a zoom operation. The window information corresponds to a portion of the image sensor. The apparatus also includes means to receive cropped image data corresponding to the portion and means to upscale the cropped image data to generate a zoomed image.

In another particular embodiment, a tangible computer readable medium stores processor-executable instructions that, when executed by a processor, cause the processor to send window information to an image sensor in response to an instruction to perform a zoom operation. The window information corresponds to a portion of the image sensor. The instructions are further executable by the processor to receive cropped image data corresponding to the portion from the image sensor and to upscale the cropped image data to generate a zoomed image.

In another particular embodiment, a method is disclosed that includes receiving first image data from an image sensor at a first pixel clock rate. The method also includes receiving an instruction to perform a zoom operation and sending window information to the image sensor in response to the instruction. The method further includes receiving cropped image data corresponding to a portion of the image sensor that is associated with the zoom operation. The cropped image data is received at a second pixel clock rate that is slower than the first pixel clock rate. The method also includes upscaling the cropped image data to generate a zoomed image.

In another particular embodiment, a system is disclosed that includes a processor and a memory accessible to the processor. The memory includes instructions that are executable by the processor to send window information to an image sensor in response to an instruction to implement a zoom operation. The instructions are also executable by the processor to cause a pixel clock rate of the image sensor to be reduced from a first pixel clock rate to a second pixel clock rate that is less than the first pixel clock rate. The instructions are also executable by the processor to receive cropped image data corresponding to a portion of the image sensor that is associated with the zoom operation. The cropped image data is received from the image sensor at the second pixel clock rate. The instructions are also executable by the processor to upscale the cropped image data to generate a zoomed image.

One particular advantage provided by at least one of the disclosed embodiments is that a zoomed image may be generated without increasing a pixel clock rate of an image processing system. Another particular advantage that is provided by at least one of the disclosed embodiments is that improved image quality for zoomed images may be achieved.

Other aspects, advantages, and features of the present disclosure will become apparent after review of the entire application, including the following sections: Brief Description of the Drawings, Detailed Description, and the Claims.

III. BRIEF DESCRIPTION OF THE DRAWINGS

IV. DETAILED DESCRIPTION

Figure 1:
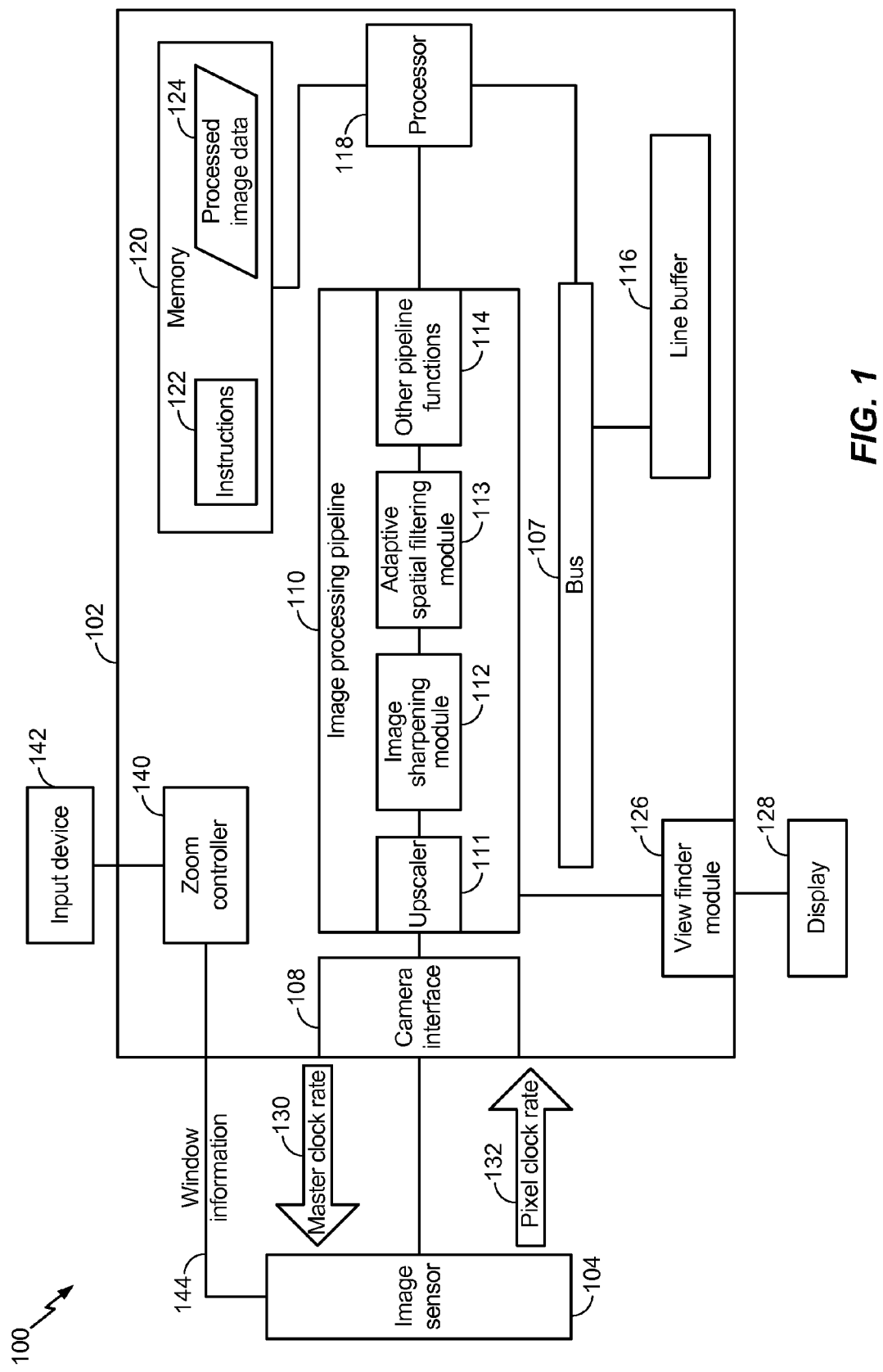
FIG. 1 is a block diagram of a particular illustrative embodiment of a system to generate a zoomed image.

FIG. 1 is a block diagram of a particular illustrative embodiment of a system to generate a zoomed image, the system designated 100. The system 100 may be a portable electronic device, such as a digital camera, a mobile telephone, a portable computing device, or another portable electronic device or apparatus that includes a camera. The system 100 includes an image sensor 104 coupled to an image processing system 102. The system 100 may also include other components that are not illustrated, such as autofocus components, lenses, aperture control components, and so forth. Also, unless otherwise indicated in a particular context, the term "image" is used herein to refer to a moving image (e.g., a movie or video image) or to a still image (e.g., a photograph or picture).

The system 100 includes a camera interface 108 to connect the image sensor 104 to the image processing system 102. The system 100 may also include an input device 142 (such as a switch, a soft switch, touch screen, or a button) that is adapted to receive user input to implement a zoom operation. The system 100 may also include a display 128 that is adapted to display images captured by the image sensor 104, images stored in a memory 120, or both. In a particular embodiment, the display 128 may include a viewfinder, and a viewfinder module 126 of the image processing system 102 may generate a preview image for display at the display 128.

The image processing system 102 may include an image processing pipeline 110 that is configured to perform various image processing functions (illustrated as processing modules 111-114) to generate an image from image data captured by the image sensor 104. For example, the image processing pipeline 110 may include an upscaler 111 to upscale the image data to generate upscaled image data. To illustrate, the upscaler 111 may interpolate or extrapolate additional pixels between pixels in the image data captured by the image sensor 104. The image processing pipeline 110 may also include an image sharpening module 112 to perform one or more image sharpening functions on the image data or the upscaled image data, an adaptive spatial filtering module 113 to perform spatial filtering on the image data or the upscaled image data, other pipeline functions 114 (e.g., demosaicing, gamma correction, white balance, compression, color space conversion, etc.), or any combination thereof.

The image processing system 102 may also include a line buffer 116 that is used to store lines of image data during processing by modules of the image processing pipeline 110, a processor 118, or both. The processor 118 may be adapted to execute instructions 122 stored in the memory 120 to process, store or display the image. For example, the processor 118, the image processing pipeline 110, or any combination thereof, may store processed image data 124 at the memory 120. The processed image data 124 may be compressed data (e.g., joint picture expert group (JPEG) image data) or uncompressed data.

In a particular embodiment, the image processing system 102 includes a zoom controller 140. The zoom controller 140 is adapted to implement a zoom operation in response to user input received via the input device 142. The zoom controller 140 is illustrated in FIG. 1 as a separate module; however, in certain embodiments, functionality of the zoom controller 140 may be performed by several modules of the image processing system 102, by instructions 122 executed by the processor 118, or by any combination thereof. The zoom controller 140 may send instructions to the image sensor 104, the image processing pipeline 110, the processor 118, the view finder module 126 or any combination thereof, to implement the zoom operation. The instructions sent by the zoom controller 140 may include, for example, window information 144 that may be sent to the image sensor 104 to indicate a portion of the image sensor 104 that is to provide image data for the zoom operation. The instructions sent by the zoom controller 140 may cause a pixel clock rate 132 of the image sensor 104 to be changed to implement the zoom operation. For example, the zoom controller 140 may cause a master clock rate 130 that is provided to the image sensor 104 to be modified, which may result in the pixel clock rate 132 being modified. The image sensor 104 may be adapted to change from a first pixel clock rate to a second pixel clock rate without causing an interruption in a frame rate at which image data is captured or output by the image sensor 104. For example, when the image sensor 104 is outputting image data at a rate of 30 frames per second before the pixel clock rate 132 is changed, the image sensor 104 may continue to output the image data at 30 frames per second after the pixel clock rate 132 is changed. The image sensor 104 may further be adapted to change from the first pixel clock rate to the second pixel clock rate without entering a non-active mode (e.g., a standby mode) and without missing any frames (e.g., while maintaining a frame rate of the image sensor).

In operation, the system 100 may be used to capture images and to store the processed image data 124 at the memory 120. A user may indicate that a zoom operation is to be performed by providing an input via the input device 142. In response to the user input received via the input device 142, the zoom controller 140 may send the window information 144 to the image sensor 104. In response to the window information 144, the image sensor 104 may generate cropped image data that corresponds to the portion of the image sensor 104 that is identified by the window information 144. To illustrate, the window information 144 may specify a set of pixels of the image sensor 104 that are to generate the cropped image data, and the image sensor 104 may send the image data associated with pixels of the set of pixels. The zoom controller 140 may also cause the pixel clock rate 132 of the image sensor 104 to be reduced. For example, the zoom controller 140 may reduce the master clock rate 130 resulting in the pixel clock rate 132 of the image sensor 104 being reduced.

The cropped image data may be sent to the upscaler 111 via the camera interface 108. The upscaler 111 may upscale the cropped image data to generate zoomed image data. Upscaling the cropped image data causes the image data to include more pixels. The zoomed image data may be provided to other functions of the image processing pipeline 110, such as the image sharpening module 112, the adaptive spatial filtering module 113, the other pipeline functions 114, or any combination thereof. Thus, the cropped image data may be upscaled before other image processing pipeline functions are performed, which may provide improved image quality relative to upscaling image data after the image processing pipeline functions have been performed. Additionally, since the pixel clock rate 132 is reduced in order to output the cropped image data, the pixel clock rate of the image processing pipeline 110 does not become excessive when the number of pixels of the image data is increased by the upscaler 111.

In a particular embodiment, the cropped image data may be provided to the upscaler 111 without first being stored in the line buffer 116, which may reduce latency in generating the zoomed image. Further, since the cropped image data is received from the image sensor 104 rather than being generated in the image processing system 102 by cropping image data from the entire image sensor 104, no additional bus bandwidth is used to process or upscale the image data. Thus, power and bus bandwidth that would be used to write image data to the line buffer and to read the image date from the line buffer may be conserved.

Before the zoom operation is performed, the view finder module 126 may generate a preview display at the display 128 using sub-sampled image data from the image sensor 104. Sub-sampling refers to removing or omitting certain pixels or combining certain pixels in order to reduce a number of pixels represented in the sub-sampled image data. The number of pixels may be reduced in a relatively uniform manner (e.g., in a manner that retains the entire image but at a lower resolution), in contrast to cropping the image data, which refers to removing entire sections of the image. When the zoom operation is performed, the view finder module 126 may generate a zoomed preview display using the cropped image data. The cropped image data may not be sub-sampled. Thus, the zoomed preview display may be generated based on data that is not sub-sampled.

Figure 2:
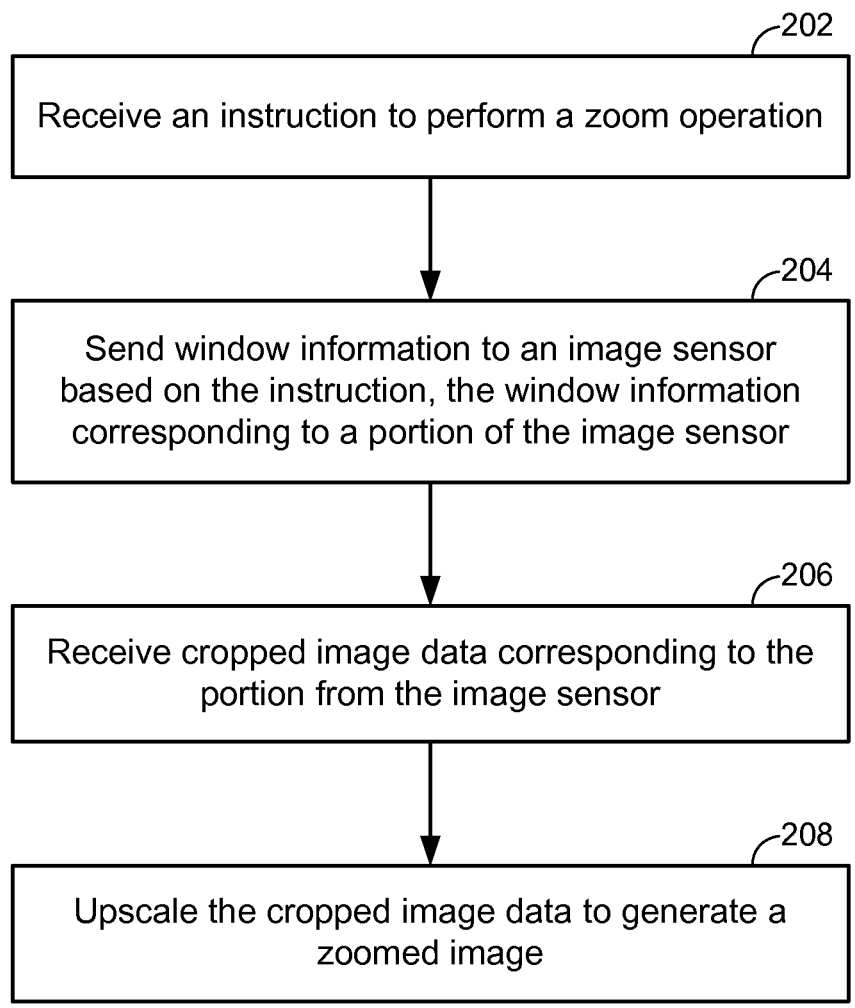
FIG. 2 is a flow chart of a first particular embodiment of a method of generating a zoomed image.

FIG. 2 is a flow chart of a first particular embodiment of a method of generating a zoomed image. The method illustrated in FIG. 2 includes, at 202, receiving an instruction to perform a zoom operation. For example, a user may provide a user input via an input device of an apparatus, such as the system 100 of FIG. 1, to indicate that a zoom operation is to be performed. The apparatus may generate the instruction to perform the zoom operation in response to the user input.

The method may also include, at 204, sending window information to an image sensor based on the instruction. The window information may correspond to a portion of the image sensor. For example, the zoom controller 140 of FIG. 1 may send the window information 144 to the image sensor 104. The window information 144 may indicate a particular portion of the image sensor 104 from which image data is to be output by the image sensor 104.

The method may also include, at 206, receiving cropped image data corresponding to the portion from the image sensor. For example, the image sensor 104 of FIG. 1 may output the cropped image data in response to the window information 144. The method may also include, at 208, upscaling the cropped image data to generate a zoomed image. To illustrate, the upscaler 111 of FIG. 1 may receive the cropped image data and may upscale the cropped image data to generated zoomed image data corresponding to a zoomed image.

The method of FIG. 2 may be implemented using a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method of FIG. 2 can be performed by a processor that executes instructions.

Figure 3:
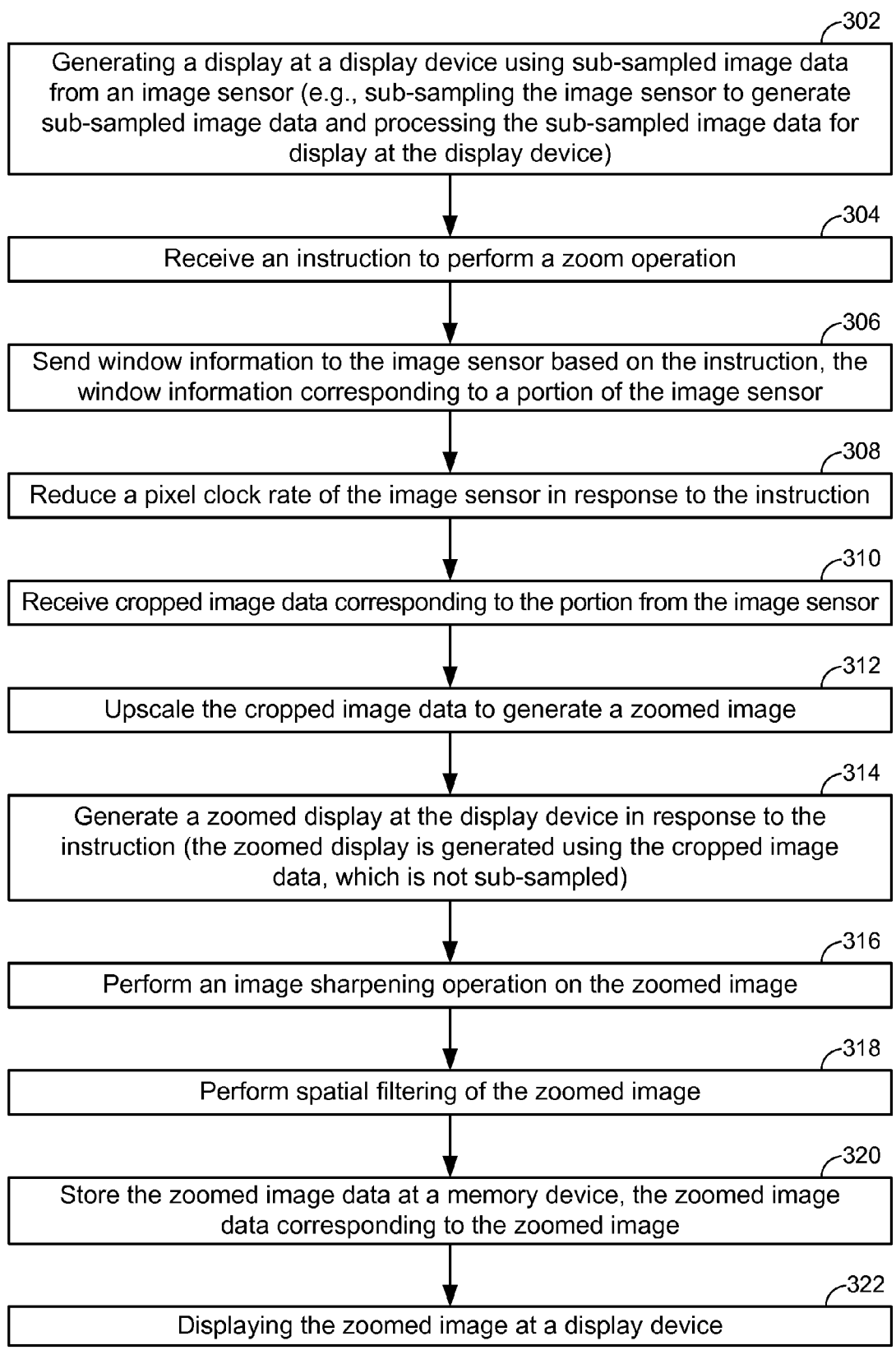
FIG. 3 is a flow chart of a second particular embodiment of a method of generating a zoomed image.

FIG. 3 is a flow chart of a second particular embodiment of a method of generating a zoomed image. The method illustrated in FIG. 3 includes, at 302, generating a display at a display device using sub-sampled image data from an image sensor. For example, the view finder module 126 of FIG. 1 may generate a view finder display at the display 128 using sub-sampled image data. To illustrate, the image sensor 104 may output sub-sampled image data or the image processing pipeline 110 may include a functional module that sub-samples the image data provided by the image sensor 104 to generate the sub-sampled image data. The sub-sampled image data may be processed for display at the display 128.

The method may also include, at 304, receiving an instruction to perform a zoom operation. For example, a user may provide a user input via an input device of an apparatus, such as the system 100 of FIG. 1, to indicate that a zoom operation is to be performed. The system 100 may generate the instruction to perform the zoom operation in response to the user input.

The method may also include, at 306, sending window information to the image sensor based on the instruction. The window information may correspond to a portion of the image sensor. For example, the zoom controller 140 of FIG. 1 may send the window information 144 to the image sensor 104. The window information 144 may indicate a particular portion of the image sensor 104 from which image data is to be output by the image sensor 104.

The method may also include, at 308, reducing a pixel clock rate of the image sensor in response to the instruction to perform the zoom operation. For example, the image processing system 102 of FIG. 1 may provide the master clock signal to the image sensor 104. The master clock signal may be specify the master clock rate 130, which may be used to determine the pixel clock rate 132 of the image sensor 104. Thus, by reducing the master clock rate 130, the pixel clock rate 132 may be reduced.

The method may also include, at 310, receiving cropped image data corresponding to the portion from the image sensor. For example, the image sensor 104 of FIG. 1 may output cropped image data in response to the window information 144. The method may also include, at 312, upscaling the cropped image data to generate a zoomed image. To illustrate, the upscaler 111 of FIG. 1 may receive the cropped image data and may upscale the cropped image data to generate zoomed image data corresponding to a zoomed image. In a particular embodiment, the cropped image data is not stored in a line buffer before the cropped image data is upscaled. Thus, power and bus bandwidth that would be used to write image data to the line buffer and to read the image date from the line buffer may be conserved.

The method may also include, at 314, generating a zoomed display at the display device in response to the instruction. For example, the view finder module 126 of FIG. 1 may generate a view finder display of the zoomed image at the display 128. As described above, when an image is not zoomed, the view finder module 126 may generate the view finder display using sub-sampled image data. However, to generate a zoomed view finder display, the view finder module 126 may use cropped image data from the image sensor 104 that is not sub-sampled.

The method may also include performing additional image processing using zoomed image data corresponding to the zoomed image. For example, the method may include performing an image sharpening operation on the zoomed image, at 316, performing spatial filtering of the zoomed image, at 318, or both. Other image processing operations may be performed as well or in the alternative. The method may also include storing the zoomed image data at a memory device, at 320, displaying the zoomed image at a display device, at 322, or any combination thereof.

The method of FIG. 3 may be implemented using a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method of FIG. 3 can be performed by a processor that executes instructions.

Figure 4:
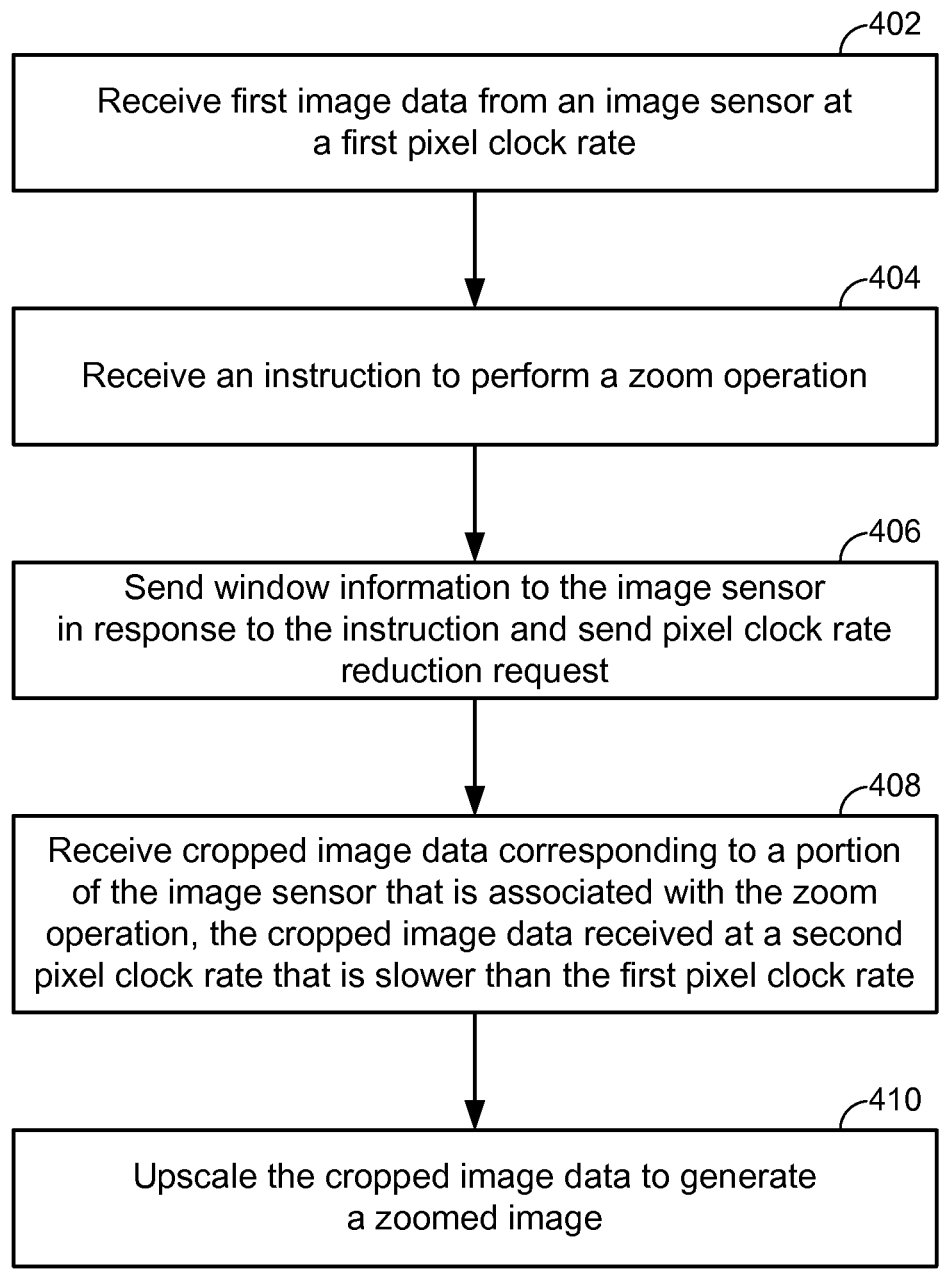
FIG. 4 is a flow chart of a third particular embodiment of a method of generating a zoomed image.

FIG. 4 is a flow chart of a third particular embodiment of a method of generating a zoomed image. The method illustrated in FIG. 4 includes, at 402, receiving first image data from an image sensor at a first pixel clock rate. For example, before an instruction to perform a zoom operation is received at the system 100 of FIG. 1, the image sensor 104 may output the first image data at a first pixel clock rate. The method may also include, at 404, receiving an instruction to perform a zoom operation. For example, a user may provide a user input to indicate that a zoom operation is to be performed via the input device 142 of the system 100 of FIG. 1. The system 100 may generate the instruction to perform the zoom operation in response to the user input.

The method may also include, at 406, sending window information to an image sensor based on the instruction. The window information may correspond to a portion of the image sensor. For example, the zoom controller 140 of FIG. 1 may send the window information 144 to the image sensor 104. The window information 144 may indicate a particular portion of the image sensor 104 from which image data is to be output by the image sensor 104. The method may also include, at 406, sending a pixel clock rate reduction request. In response to the pixel clock rate reduction request, a pixel clock rate of the image sensor may be reduced such that a frame rate of image data captured by the image sensor is maintained.

The method may also include, at 408, receiving cropped image data corresponding to the portion from the image sensor. The cropped image data may be received at a second pixel clock rate that is slower than the first pixel clock rate. For example, the image sensor 104 of FIG. 1 may output cropped image data in response to the window information 144. The master clock rate 130 may be reduced, causing the pixel clock rate 132 to be reduced. The method may also include, at 410, upscaling the cropped image data to generate a zoomed image. To illustrate, the upscaler 111 of FIG. 1 may receive the cropped image data and may upscale the cropped image data to generated zoomed image data corresponding to a zoomed image.

The method of FIG. 4 may be implemented using a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method of FIG. 4 can be performed by a processor that executes instructions.

Figure 5:
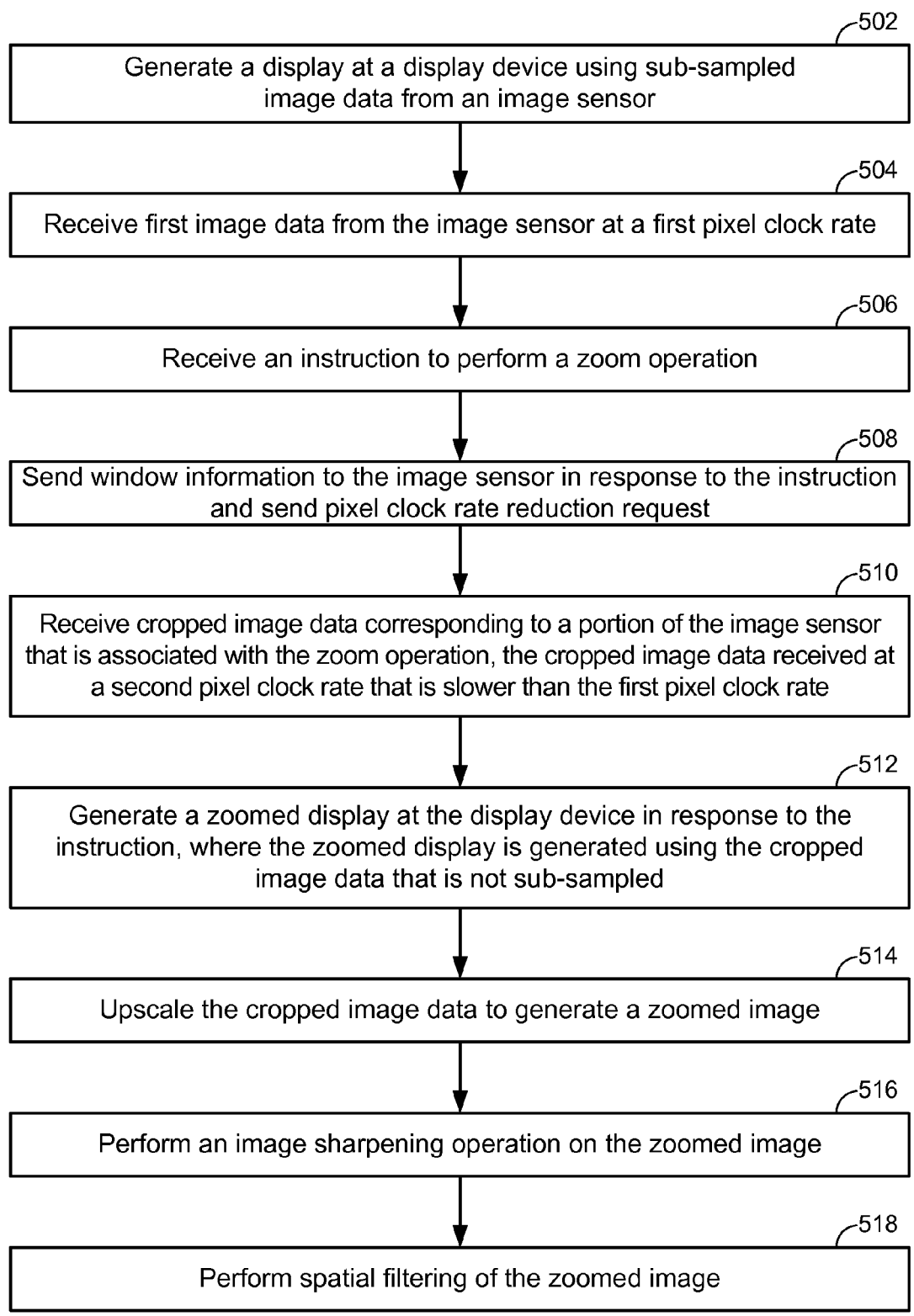
FIG. 5 is a flow chart of a fourth particular embodiment of a method of generating a zoomed image.

FIG. 5 is a flow chart of a fourth particular embodiment of a method of generating a zoomed image. The method illustrated in FIG. 5 includes, at 502, generating a display at a display device using sub-sampled image data from the image sensor. For example, the view finder module 126 of FIG. 1 may generate a view finder display at the display 128 using sub-sampled image data. To illustrate, the image sensor 104 may output sub-sampled image data or the image processing pipeline 110 may include a functional module that sub-samples the image data provided by the image sensor 104 to generate the sub-sampled image data. The sub-sampled image data may be processed for display at the display 128.

The method may also include, at 504, receiving first image data from an image sensor at a first pixel clock rate. For example, before an instruction to perform a zoom operation is received at the system 100 of FIG. 1, the image sensor 104 may output the first image data at a first pixel clock rate. The method may also include, at 506, receiving the instruction to perform the zoom operation. For example, a user may provide a user input to indicate that the zoom operation is to be performed via the input device 142 of the system 100 of FIG. 1. The system 100 may generate the instruction to perform the zoom operation in response to the user input.

The method may also include, at 508, sending window information to the image sensor based on the instruction and sending a pixel clock rate reduction request. The window information may correspond to a portion of the image sensor. For example, the zoom controller 140 of FIG. 1 may send the window information 144 to the image sensor 104. The window information 144 may indicate a particular portion of the image sensor 104 from which image data is to be output by the image sensor 104. The method may also include, at 510, receiving cropped image data corresponding to the portion from the image sensor. In response to the pixel clock rate reduction request, the cropped image data may be received at a second pixel clock rate that is slower than the first pixel clock rate. For example, the image sensor 104 of FIG. 1 may output cropped image data in response to the window information 144. The master clock rate 130 may be reduced, causing the pixel clock rate 132 to be reduced.

The method may include, at 514, upscaling the cropped image data to generate a zoomed image. To illustrate, the upscaler 111 of FIG. 1 may receive the cropped image data and may upscale the cropped image data to generate zoomed image data corresponding to a zoomed image. The method may also include performing additional image processing using the zoomed image data. For example, the method may include performing an image sharpening operation on the zoomed image, at 516, and performing spatial filtering of the zoomed image, at 518. Other image processing operations may be performed as well or in the alternative.

The method of FIG. 5 may be implemented using a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method of FIG. 5 can be performed by a processor that executes instructions.

Figure 6:
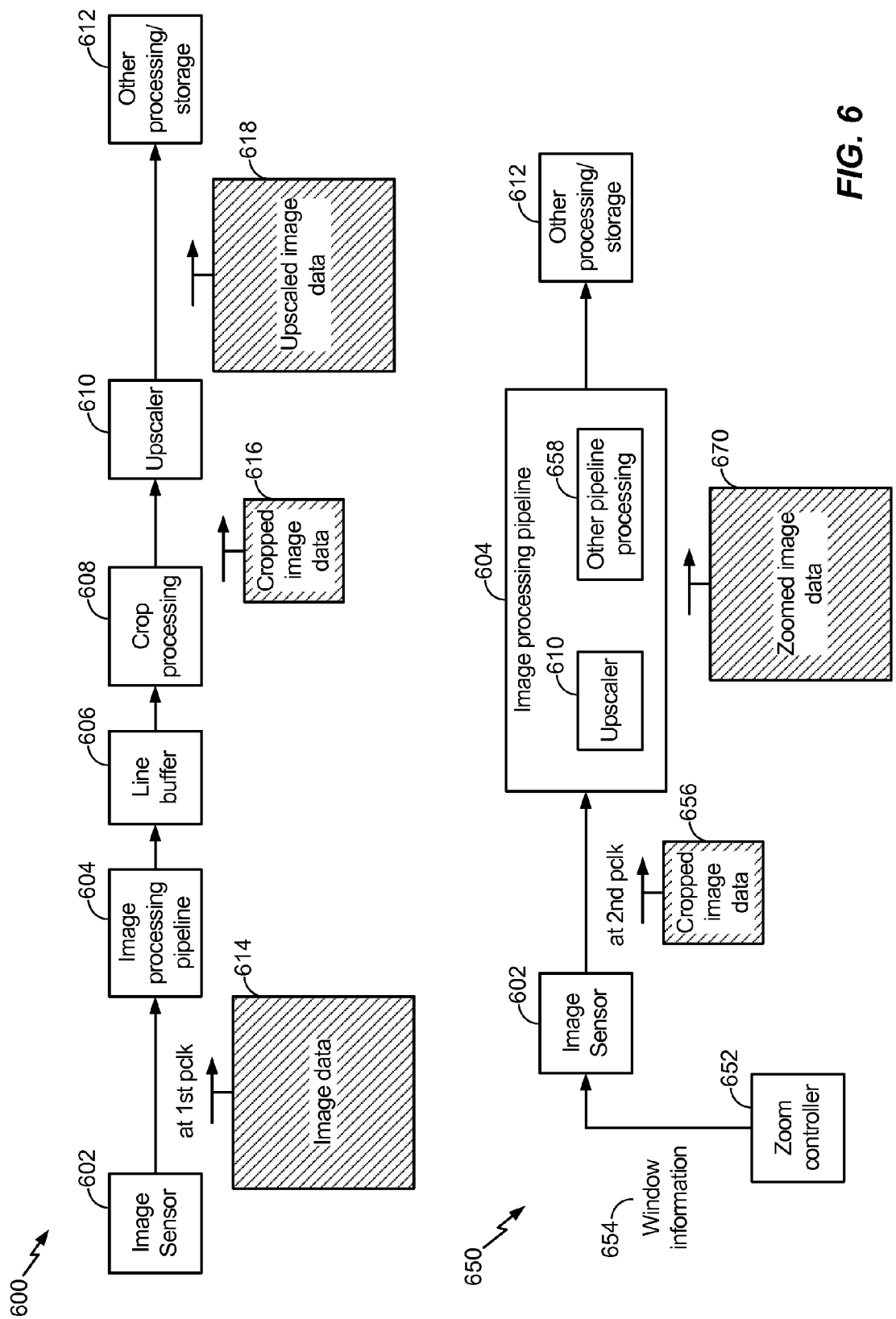
FIG. 6 is a diagram illustrating distinctions in methods of generating a zoomed image.

FIG. 6 is a diagram illustrating distinctions between methods of generating a zoomed image. In FIG. 6, a first method of generating the zoomed image is designated 600 and a second method of generating the zoomed image is designated 650. In the first method 600, an image sensor 602 generates image data 614 at a first pixel clock rate. For example, when the image sensor 602 is a nominal 5 megapixel (MP) image sensor, the image sensor 602 may include an array of pixels, such as an array including approximately 2608×1950 pixels. When the image sensor 602 generates images at a frame rate of 12 frames per second, the first pixel clock rate of the image sensor 602 may be about 120 Mhz. The image data 614 may be sent to an image processing pipeline 604 to have various image processing operations performed, e.g., demosaicing, color domain conversion, image sharpening, spatial filtering, etc. The image processing pipeline 604 may process the image data 614 and write the image data 614 to one or more line buffers 606. The processed image data may be cropped by a crop processing module 608 to generate cropped image data 616. The cropped image data 616 may be upscaled by an upscaler 610 to generate upscaled image data 618. The upscaled image data 618 may be provided to other processing or storage modules 612 for further processing and storage.

In an illustrative example of the method 600, when the zoom operation corresponds to a 4× zoom operation, the cropped image data 616 may be increased sixteen fold (i.e., 4× vertical resolution and 4× horizontal resolution). Thus, the upscaled image data 618 may include approximately 16 times as many pixels as the cropped image data 616. Since the cropped image data 616 is processed at the first pixel clock rate (e.g., about 120 Mhz), the upscaling results in the upscaled image data 618 being generated at pixel clock rate (e.g., about 1920 Mhz) that is sixteen times larger than the first pixel clock rate. Thus, the first method 600 may result in a significant increase in the pixel clock rate when a zoomed image is generated.

To illustrate particular distinctions between the first method 600 and the second method 650, certain characteristics of the systems and modules that perform the methods are described as common between the two methods. For example, images may be generated at the same frame rate between the two methods (e.g., 12 frames per second). Additionally, the zoom operation described for the second method 650 may be similar in magnitude to the zoom operation that is described for the first method 600 (e.g., a 4× zoom). These similarities are merely for convenience of describing and comparing the two methods 600, 650 and are not intended as limitations. For example, the first method 600 or the second method 650 may operate at frame rates greater than 12 frames per second or less than 12 frames per second. Additionally, the frame rate in either of the methods 600, 650 may be changed to implement a zoom operation. Further, either of the methods 600, 650 may be used to perform zoom operations greater than 4× or less than 4×. Additionally, the image sensor 602 may include more than 5M pixels or fewer than 5M pixels.

In the second method 650, a zoom controller 652 provides window information 654 to the image sensor 602. The window information 654 includes information that identifies a portion of the image sensor 602 from which data is to be output as cropped image data 656. To illustrate, to perform a 4× zoom operation, the window information 654 may identify a portion that corresponds to approximately one sixteenth of the pixels of the image sensor 602 (e.g., an area of the image sensor 602 including approximately 664×492 pixels).

The zoom controller 652 may also cause the image sensor 602 to reduce the image sensor's pixel clock rate to a second pixel clock rate. For example, the zoom controller 652 may send a signal to the image sensor 602 that causes the image sensor 602 to reduce the pixel clock rate. In another example, the zoom controller 652 may cause a master clock signal sent to the image sensor 602 to be reduced, resulting in the pixel clock rate of the image sensor 602 being reduced. The image sensor 602 may output the cropped image data 656 at the second pixel clock rate. To illustrate, the second pixel clock rate may be approximately 12 Mhz.

The image processing pipeline 604 may receive the cropped image data 656. The upscaler 610 may be part of the image processing pipeline 604. For example, the upscaler 610 may precede other pipeline processing modules 658 of the image processing pipeline 604. That is, the upscaler 610 may process the cropped image data 656 before the other pipeline processing modules 658. The upscaler 610 may upscale the cropped image data 656 to generate zoomed image data 670.

For example, for the 4× zoom operation, the number of pixels of the cropped image data 656 may be increased sixteen fold by the upscaler 610. Accordingly, when the cropped image data 656 includes 664×492 pixels, the zoomed image data 670 may include 2656×1968 pixels. Increasing the number of pixels that are processed results in a corresponding increase in the pixel clock rate in the image processing pipeline 604. Thus, the pixel clock rate may be increased sixteen fold. However, since the second pixel clock rate was 12 Hz, the increased pixel clock rate in the image processing pipeline 604 after upscaling the cropped image data 656 may be approximately 192 Hz, which may be an acceptable pixel clock rate for certain image processing systems. After the zoomed image data 670 is generated, the image processing pipeline 604 may perform the other pipeline processing functions 658, such as demosaicing, image sharpening, spatial filtering, color space transformation, etc. Additionally, the other processing or storage functions 612 may be performed using the zoomed image data 670.

Thus, using the second method 650, a zoomed image can be generated without increasing a pixel clock rate of an image processing system to an unacceptable level. Additionally, other image processing pipeline functions (such as spatial filtering and image sharpening) may be performed after image data is upscaled, which may provide improved image quality relative to performing image upscaling after the image processing functions. Additionally, the above referenced improvements can be achieved without increasing latency in the image processing system or bandwidth used by the image processing system.

Figure 7:
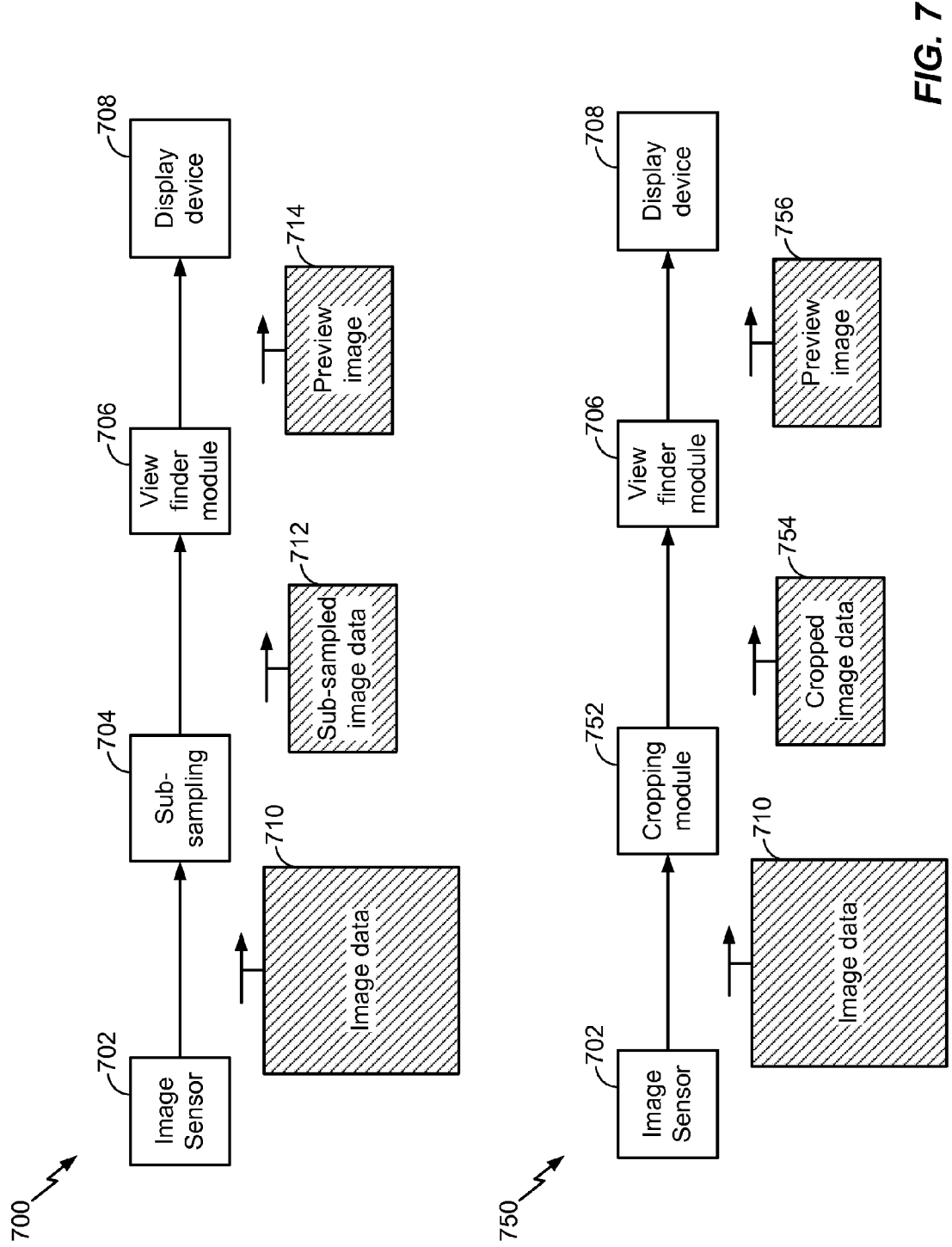
FIG. 7 is a diagram illustrating distinctions in methods of generating a preview display.

FIG. 7 is a diagram illustrating methods of generating a preview display. In FIG. 7, a first method of generating the preview display is designated 700 and a second method of generating the preview display is designated 750. In particular, the first method 700 may be used to generate the preview display before a zoom operation is implemented, and the second method 750 may be used to generate the preview display when the zoom operation is implemented.

In the first method 700, an image sensor 702 generates image data 710. The image data 710 is sub-sampled, either by the image sensor 702 or by a separate sub-sampling module 704 to generate sub-sampled image data 712. For example, the sub-sampling may include removing certain pixels or combining certain pixels to reduce a number of pixels represented in the sub-sampled image data 712. The number of pixels may be reduced in a relatively uniform manner (e.g., in a manner that retains the entire image but at a lower resolution), in contrast to cropping the image data 710 which refers to removing entire sections of the image. A view finder module 706 uses the sub-sampled image data 712 to generate a preview image 714 that is sent to a display device 708.

In the second method 750, the image sensor 702 generates the image data 710. The image data 710 is sent to a cropping module 752 without being sub-sampled. For example, the image data 710 may be sent at full resolution to the cropping module 752. The cropping module 752 may crop the image data 710 to generate cropped image data 754. The cropped image data 754 may be sent to the view finder module 706, which uses the cropped image data 754 to generate a preview image 756 that is sent to a display device 708. In a particular embodiment, the image data 710 is generated by the image sensor 702 in response to an instruction to perform a zoom operation. For example, in response to the instruction to perform the zoom operation, window information may be sent to the image sensor 702 (as described with reference to FIG. 1). In response to the window information, the image sensor 702 may generate the cropped image data 754, which may be sent to the view finder module 706. Thus, the second method 750 may generate a higher resolution preview display than the first method 700, since the preview image 756 is not generated from sub-sampled image data 712.

In conjunction with the described embodiments, a system is disclosed that may include means for sending window information to an image sensor in response to an instruction to perform a zoom operation, such as the processor 118 of FIG. 1 executing the instructions 122, the zoom controller 140 of FIG. 1, one or more other devices or circuits configured to send window information to an image sensor, or any combination thereof. The system may also include means to receive cropped image data corresponding to the portion from the image sensor, such as the camera interface 108, or the image processing pipeline 110 of FIG. 1, one or more other devices or circuits configured to receive cropped image data, or any combination thereof. The system may also include means to upscale the cropped image data to generate a zoomed image, such as the upscaler 111 of FIG. 1, one or more other devices or circuits configured to upscale the cropped image data, or any combination thereof.

Figure 8:
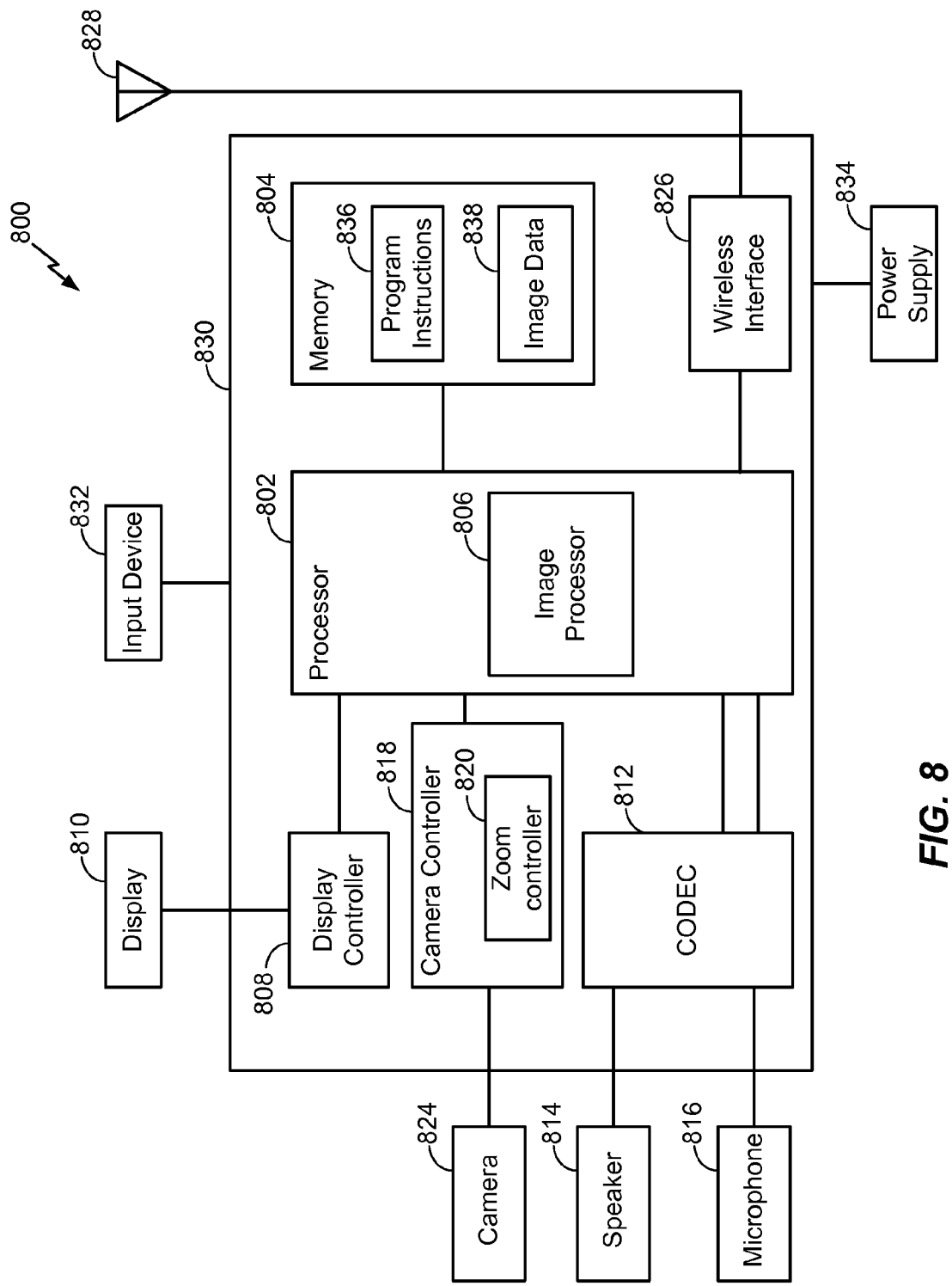
FIG. 8 is a block diagram of a particular embodiment of a portable device including an apparatus to generate a zoomed image.

Referring to FIG. 8, a block diagram of a particular illustrative embodiment of an electronic device 800 including a camera 824 and a zoom controller 820 that can implement a zoom command to generate a zoomed image is depicted. The device 800 includes a processor 802, such as a general purpose processor, an image processor, a digital signal processor, or any combination thereof, coupled to a memory 804 storing program instructions 836 that may be executable to implement the zoom controller 820. The processor 802 is also coupled to a camera controller 818 and a display controller 808. The display controller 808 is coupled to a display 810. A speaker 814 and a microphone 816 can be coupled to the processor 802 via a coder/decoder (CODEC) 812. In an illustrative example, the electronic device 800 includes or is included within the system 100 of FIG. 1, and the electronic device 800 operates in accordance with any of FIGS. 2-7, or any combination thereof, to implement a zoom operation to generate a zoomed image using image data captured by the camera 824.

FIG. 8 also indicates that a wireless interface 826 can be coupled to the processor 802 and to an antenna 828. In a particular embodiment, the processor 802, the display controller 808, the camera controller 818, the CODEC 812, the memory 804, and the wireless interface 826 are included in a system-in-package or system-on-chip device 830. In a particular embodiment, a power supply 834, the camera 824, the speaker 814, and the microphone 816 are coupled to the system-on-chip device 830. Moreover, in a particular embodiment, as illustrated in FIG. 8, the display 810, the input device 832, the speaker 814, the microphone 816, the antenna 828, and the power supply 834 are external to the system-on-chip device 830. However, each of the display 810, the input device 832, the speaker 814, the microphone 816, the antenna 828, the camera 824, and the power supply 834 can be coupled to a component of the system-on-chip device 830, such as to an interface or to a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of tangible storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving image data from an image sensor at a first pixel clock rate;
receiving an instruction to perform a zoom operation;
sending window information to the image sensor based on the instruction, the window information corresponding to a portion of the image sensor;
receiving cropped image data corresponding to the portion from the image sensor that is associated with the zoom operation, the cropped image data received at a second pixel clock rate that is slower than the first pixel clock rate; and
upscaling the cropped image data to generate a zoomed image, wherein prior to receiving the instruction, the image sensor outputs image data at a particular frame rate, wherein the particular frame rate is not changed in response to the instruction, and wherein a first portion of a line buffer is used to process the image data when the zoom operation is not implemented and a second portion of the line buffer is used to process the cropped image data after the zoom operation is implemented.

2. The method of claim 1, wherein the first pixel clock rate is 120 Mhz.

3. The method of claim 1, wherein the second pixel clock rate is 12 Mhz.

4. The method of claim 1, further comprising performing an image sharpening operation on the zoomed image.

5. The method of claim 1, further comprising performing spatial filtering of the zoomed image.

6. The method of claim 1, further comprising:
generating a display at a display device using sub-sampled image data from the image sensor before the instruction is received; and
in response to the instruction, generating a zoomed display at the display device, wherein the zoomed display is generated using the cropped image data, wherein the cropped image data is not sub-sampled.

7. The method of claim 1, further comprising storing zoomed image data at a memory device, the zoomed image data corresponding to the zoomed image.

8. The method of claim 1, further comprising displaying the zoomed image at a display device.

9. The method of claim 1, wherein the second portion of the line buffer is smaller than the first portion of the line buffer.

10. An apparatus comprising:
means for sending window information to an image sensor in response to a received instruction to perform a zoom operation, the window information corresponding to a portion of the image sensor;
means for providing a clock signal at a first pixel clock rate before the instruction is received and at a second pixel clock rate in response to the instruction, wherein the second pixel clock rate is less than the first pixel clock rate;
means for receiving cropped image data corresponding to the portion; and
means for upscaling the cropped image data to generate a zoomed image, wherein prior to receiving the instruction, the image sensor outputs image data at a particular frame rate, wherein the particular frame rate is not changed in response to the instruction, and wherein a first portion of a line buffer is used to process the image data when the zoom operation is not implemented and a second portion of the line buffer is used to process the cropped image data after the zoom operation is implemented.

11. The apparatus of claim 10, further comprising memory means to store zoomed image data corresponding to the zoomed image.

12. The apparatus of claim 10, further comprising display means to display the zoomed image.

13. The apparatus of claim 10, further comprising image processing means to perform an image sharpening operation and a spatial filtering operation on the zoomed image.

14. A non-transitory tangible computer readable medium storing processor-executable instructions that, when executed by the processor, cause the processor to:
send window information to an image sensor in response to a received instruction to perform a zoom operation, the window information corresponding to a portion of the image sensor;
reduce a pixel clock rate of the image sensor in response to the instruction;
receive cropped image data corresponding to the portion from the image sensor; and
upscale the cropped image data to generate a zoomed image, wherein, prior to receiving the instruction, the image sensor outputs image data at a particular frame rate, and wherein the particular frame rate is not changed in response to the instruction, and wherein a first portion of a line buffer is used to process the image data from the image sensor when the zoom operation is not implemented and a second portion of the line buffer is used to process the cropped image data after the zoom operation is implemented.

15. The tangible computer readable medium of claim 14, further comprising instructions that are executable by the processor to:
generate a display at a display device before the instruction is received by sub-sampling the image sensor to generate sub-sampled image data and processing the sub-sampled image data for display at the display device; and
generate a zoomed display at the display device in response to the instruction using the cropped image data, wherein the cropped image data is not sub-sampled.

16. A system comprising:
a processor;
memory accessible to the processor, wherein the memory includes instructions executable by the processor to:
send window information to an image sensor in response to an instruction to implement a zoom operation;
send a request to reduce a pixel clock rate of the image sensor to the image sensor, wherein the request causes the pixel clock rate to be reduced from a first pixel clock rate to a second pixel clock rate that is less than the first pixel clock rate;
receive cropped image data corresponding to a portion of the image sensor that is associated with the zoom operation, wherein the cropped image data is received from the image sensor at the second pixel clock rate; and
upscale the cropped image data to generate a zoomed image; and
a line buffer coupled to the processor, wherein a first portion of the line buffer is used to process image data when the zoom operation is not implemented and a second portion of the line buffer is used to process the cropped image data when the zoom operation is implemented.

17. The system of claim 16, further comprising at least one bus coupling the image sensor and the processor, wherein bandwidth of the at least one bus that is used when the zoom operation is implemented is less than or equal to bandwidth of the at least one bus that is used when the zoom operation is not implemented.

18. The system of claim 16, further comprising a view finder module, wherein the view finder module is adapted to generate an image preview display using sub-sampled image data from the image sensor when the zoom operation is not implemented and to generate the preview display using the cropped image data when the zoom operation is implemented, wherein the cropped image data is not sub-sampled.

19. The system of claim 16, wherein the second portion of the line buffer is smaller than the first portion of the line buffer.

20. The system of claim 16, further comprising an image processing pipeline coupled to the image sensor, wherein the image processing pipeline includes an upscaler that upscales the cropped image data.

21. The system of claim 20, wherein the image processing pipeline further includes an adaptive spatial filtering module coupled to the upscaler, wherein the adaptive spatial filtering module processes the zoomed image received from the upscaler.

22. The system of claim 16, wherein the image sensor is adapted to change from the first pixel clock rate to the second pixel clock rate without causing an interruption in a frame rate.

23. The system of claim 16, wherein the image sensor is adapted to change from the first pixel clock rate to the second pixel clock rate without entering a non-active mode.

* * * * *